United States Patent [19]

Shtipelman

[11] Patent Number: 4,543,020
[45] Date of Patent: Sep. 24, 1985

[54] METHOD OF MANUFACTURING LARGE GEARS

[75] Inventor: Boris A. Shtipelman, Rochester, N.Y.

[73] Assignee: USM Corporation, Farmington, Conn.

[21] Appl. No.: 494,631

[22] Filed: May 16, 1983

[51] Int. Cl.[4] .............................................. B23F 5/22
[52] U.S. Cl. ................................... 409/12; 29/26 R; 409/26; 409/51
[58] Field of Search ....................... 409/25, 26, 50, 51, 409/55, 56, 57, 61, 62, 42, 46, 1, 12, 58, 54, 2, 212

[56] References Cited

U.S. PATENT DOCUMENTS

| | | | |
|---|---|---|---|
| 1,492,627 | 5/1924 | Cole | 409/47 |
| 2,393,696 | 1/1946 | Kraut et al. | 409/212 X |
| 2,975,681 | 3/1961 | Wildhaber | 409/58 |
| 3,138,996 | 6/1964 | Dammert et al. | 409/54 |
| 3,841,198 | 10/1974 | Cornford | 409/2 |
| 4,244,668 | 1/1981 | Demuth | 409/46 |

FOREIGN PATENT DOCUMENTS 0730500 4/1980 U.S.S.R. .............................. 409/12

Primary Examiner—William R. Briggs
Assistant Examiner—Glenn L. Webb
Attorney, Agent, or Firm—Aubrey C. Brine

[57] ABSTRACT

A method of manufacturing large gears by performing all steps required on a single vertical boring mill without removing the gear blank from the rotary table of the mill.

4 Claims, 6 Drawing Figures

METHOD OF MANUFACTURING LARGE GEARS

FIELD OF THE INVENTION

This invention relates to a method of manufacturing large gears.

DESCRIPTION OF THE PRIOR ART

Production of large gears in the past has required the use of a number of metal cutting machines to perform on rough gear blanks a variety of necessary operations such as milling, turning, boring, facing, drilling, thread cutting and gear teeth cutting operations. Large gears in the context of the present invention typically may range in outside diameter from forty inches to forty feet and over depending on the capacity of the machinery used. Such gears may be made from single piece blanks or may be made from multiple parts joined together to form unitary blanks.

Gear teeth cutting machinery presently available are not suitable for general machining operations such as milling, turning, boring, drilling and thread cutting. Conversely, up to now, machinery available for such operations generally are not suitable for gear teeth cutting. Typically, the several machines needed to manufacture large gears involve the following types: Horizontal boring mills to machine mating surfaces and to drill and tap locating and joint holes where the large gears involve multiple part blanks. Vertical boring mills to turn, face and bore gear blanks, whether single or multi-part. Gear cutting machines to rough the gear teeth by hobbing, gashing, form milling and the like. Gear generators to finish the teeth with shape generating relative motions between the gear blank and the cutting tool. These machines are well known and it should not be necessary to specifically describe each machine.

Obviously the use of a number of separate machines to manufacture large gears, requires large capital investments in machinery. Furthermore, the cost of the machinery, the required floor space, transportation of the gear blank from machine to machine and the set-up time required to accurately register the blank at each machine altogether require large expenditures for machining such large gears.

Accordingly, it is a general object of the invention to provide a method using one machining center greatly reducing the expense and greatly increasing the efficiency of time and manpower compared to the usual manufacture of large gears.

SUMMARY OF THE INVENTION

The present invention provides a method for manufacture of large gears using a single machining center such as a large vertical boring mill of the type using a rotatable table for holding the gear blank, and a tool holder movable with respect to the axis of rotation of the table. Once the rough blank is registered and secured to the table it is not removed or its location on the table changed until the blank is completely machined and the gear teeth have been cut. The relative motions between the table and the tool holder typically are controlled by conventional manual or computer operated numerical control systems.

DESCRIPTION OF THE PREFERRED EMBODIMENT

Figure 1:
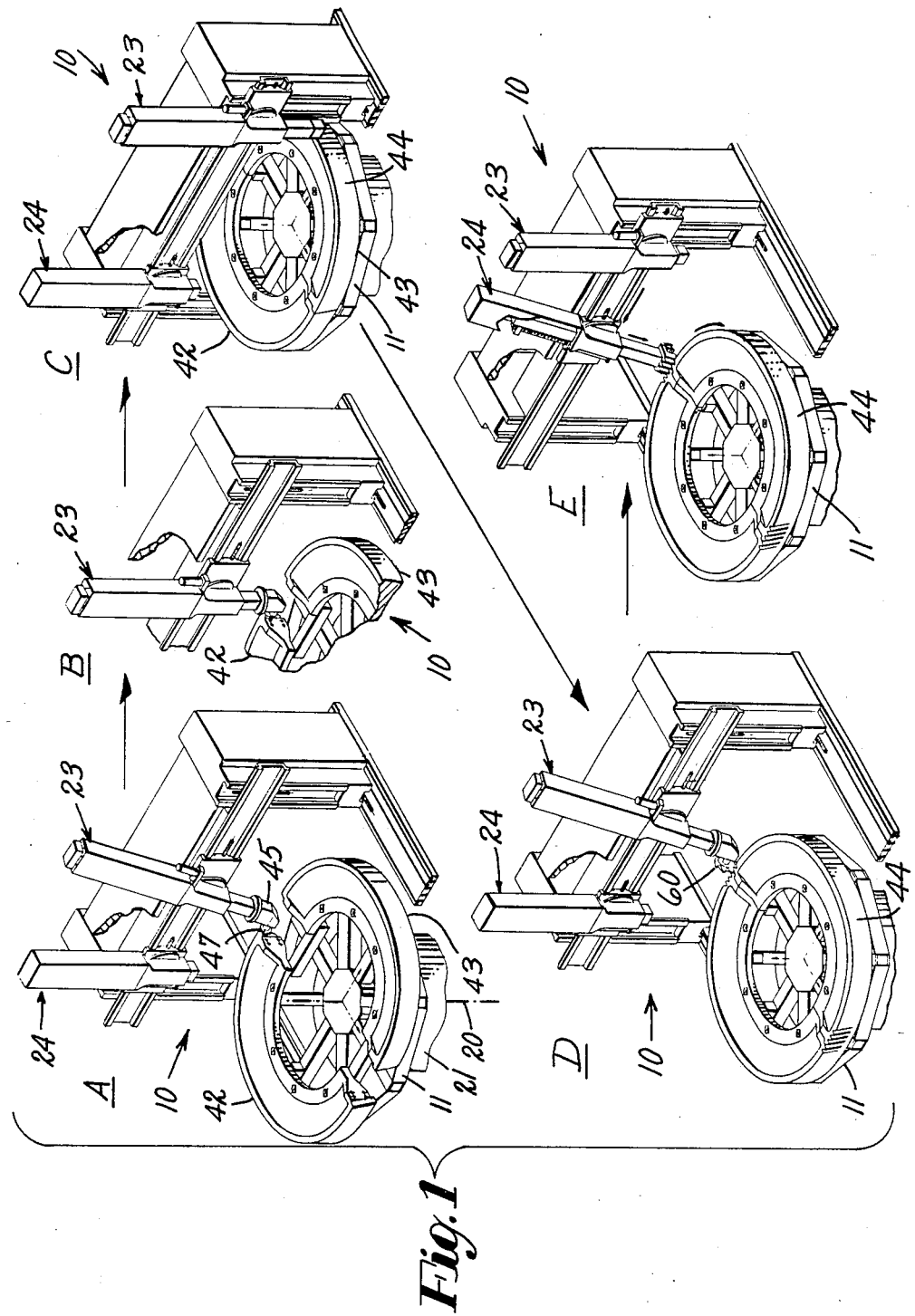
FIG. 1 is a diagram illustrating the various steps of the inventive method used to manufacture large gears.

Referring to FIG. 1, there is shown a schematic representation of the sequence of the various operations to be performed to manufacture a complete gear according to the method of the present invention. The same vertical boring mill 10 is represented in simplified form in each of the steps A, B, C, D and E.

Figure 2:
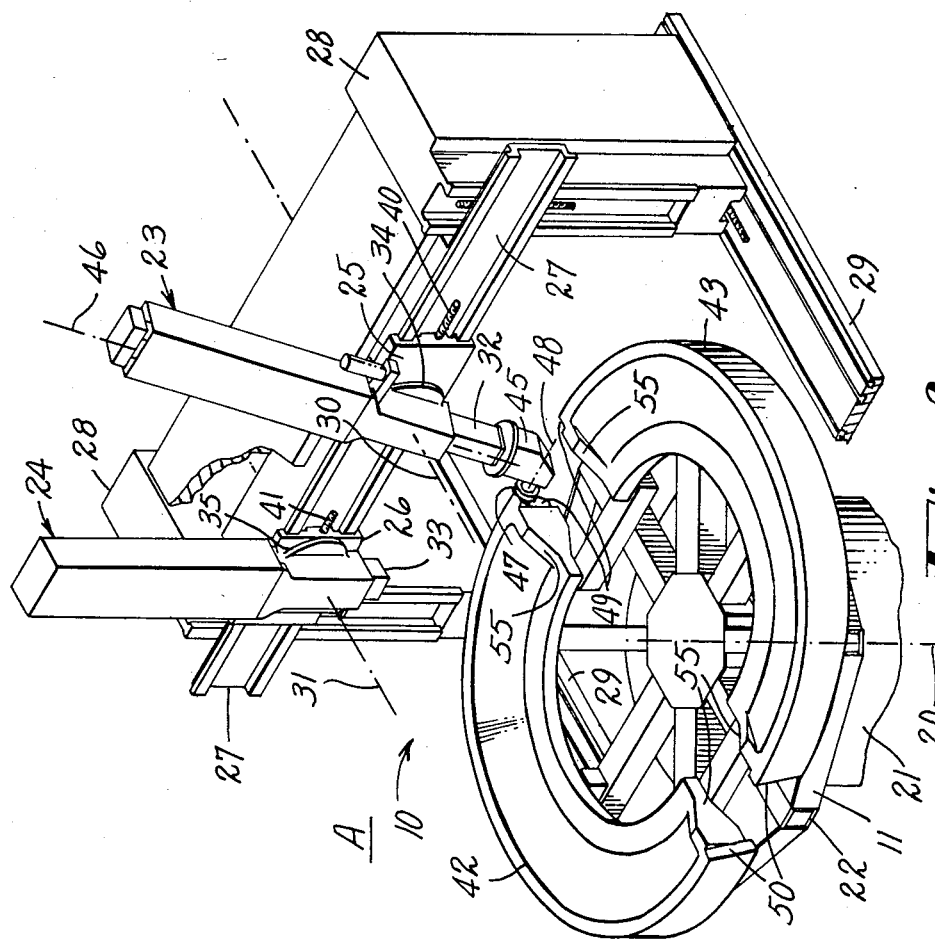
FIG. 2 is a perspective diagrammatic view of a large vertical boring mill carrying out the initial machining of mating surfaces for a multi-part gear blank.

The boring mill 10 (which may be any one of a variety of commercially available equipment) basically comprises a table 11 rotatable on a vertical axis 20 (see also FIG. 2). The table may rest on hydrostatic or other antifriction thrust bearings (not shown) and also is journalled in radial bearings on a center post (not shown) at the axis 20, the post being secured to a bed 21. To support workpieces larger than the table, outrigger supports 22 may be provided. The table 11 typically is driven by an electric or hydraulic motor (not shown) through a two-range gear box by an output pinion engaging a ring gear secured to the underside of the table. For table indexing movements; a separate slow speed indexing drive (not shown) may be provided. The table positioning and indexing accuracies suitable to manufacture gears typically may be achieved through use of controls such as of rotary inductosyn scale feedback mechanisms commonly located in the center post area.

The vertical boring mill 10 (FIG. 2) used in all the steps A, B, C, D preferably includes two tool carrying heads 23, 24 carried on saddles 25, 26 each mounted for horizontal movements on a crossrail 27. The crossrail is carried at opposite ends for heightwise adjusting movement on upright columns 28 which are movable horizontally on ways 29 toward and away from the axis of rotation 20 of the rotary table. The heads 23, 24 also may be mounted on swivel heads 34, 35 on the saddles 25, 26 for swivelling movements on axes 30, 31 respectively for purposes which will appear. The tools for machining the gear blank are secured at the lower ends of rams 32, 33 mounted for heightwise movements in the heads 23, 24. Typically, the saddles 25, 26 carrying the swivel heads and the rams are mounted on the crossrail and in the tool heads by hydrostatic bearings, the saddles being driven along the crossrail by ball screws 40 and 41 and preloaded ball nuts (not shown). The screws may be driven by electrical or hydraulic motors with closed loop feedback systems being used for accurate location and/or drive of the tool heads. Likewise, the heightwise movement of the tool head rams 32, 33 and the crossrail may be driven and controlled in similar manner.

The various feed and adjusting movements of the above elements may be coordinated by computer controlled numerical control units to control movement and receive and compare feedback signals using controls supplied by various manufacturers and utilizing well known commercially available equipment. To this point, the vertical boring mills have been described in generalities to the extent necessary only to the understanding of the method of the invention. Such machines, also called machining centers, are commercially available from the Farrel Division of USM Corporation with manual or computer controlled numerical control units obtained from various manufacturers to suit the needs of the customers.

Commonly large gears are made from cast metal blanks formed from two or more segments. Referring to Step A of FIG. 1 and to FIG. 2 there is shown two segments 42 and 43 to be machined and assembled to form a unitary gear blank 44 (step C, FIG. 1 and FIG. 4). In step A (FIGS. 1 and 2) the two 42, 43 segments are assembled in spaced but aligned relative locations and secured as by clamps (not shown) to the rotary table 11. The lower end of the ram 32 has mounted thereon a live spindle tool support 45 capable of rotatable adjustment about an axis 46. An end mill 47 or other suitable cutter is mounted in the live spindle so as to be driven in rotation about an axis 48. The swivel head 34 is adjusted about axis 30 to an angle corresponding to the desired angle of mating surfaces 49 on the blank segments 42, 43. The surfaces 49 are milled during heightwise movements of the ram 32 along axis 46 and any necessary horizontal movements of the column 28 along the ways 29. The mating surface 49 on segment 43 is then milled after the spindle 45 is indexed 180° on axis 46 so that any error in swivel positioning significantly is reduced. The table is indexed 180° on axis 20 and the operations repeated to machine the mating surfaces 50 at the diametrically opposite sides of the blanks 42, 43. Obviously if the gear blanks are composed of other numbers of segments, then the table would be suitably indexed to match the number of segments.

Figure 3:
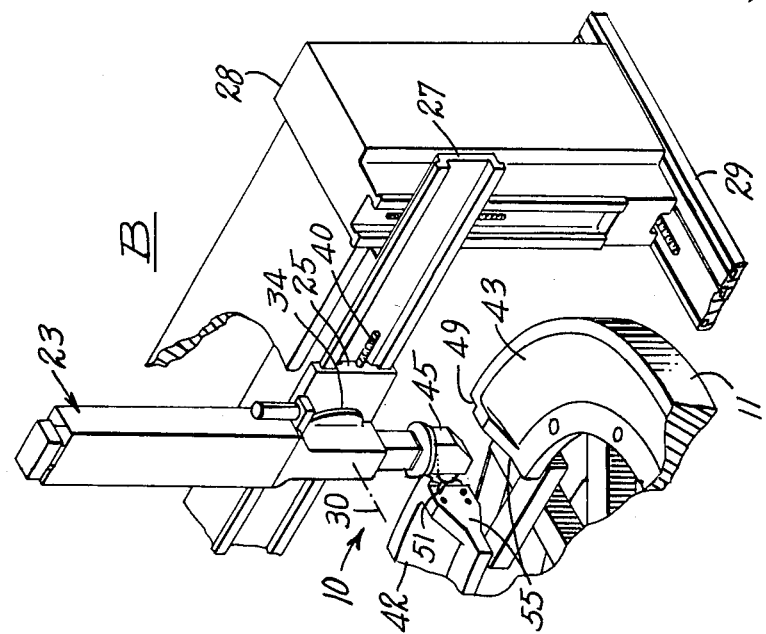
FIG. 3 is a portion of the machine shown in FIG. 2 and illustrating the drilling and tapping operations on the gear blank needed to secure together the various parts of the gear blank.

Referring to step B of FIG. 1 (also FIG. 3) the head 34 has been returned to vertical position and end mills, drills and/or taps 51 are alternately mounted in the live spindle of tool support 45. By appropriate movements of the saddle 25 along the crossrail 27 and of the ram 32 heightwise in head 25 and of the columns 28 along ways 29 the bracket portions 55 of the blank segments are milled, drilled and or tapped to provide means to secure the segments together to form a unitary gear blank.

Figure 4:
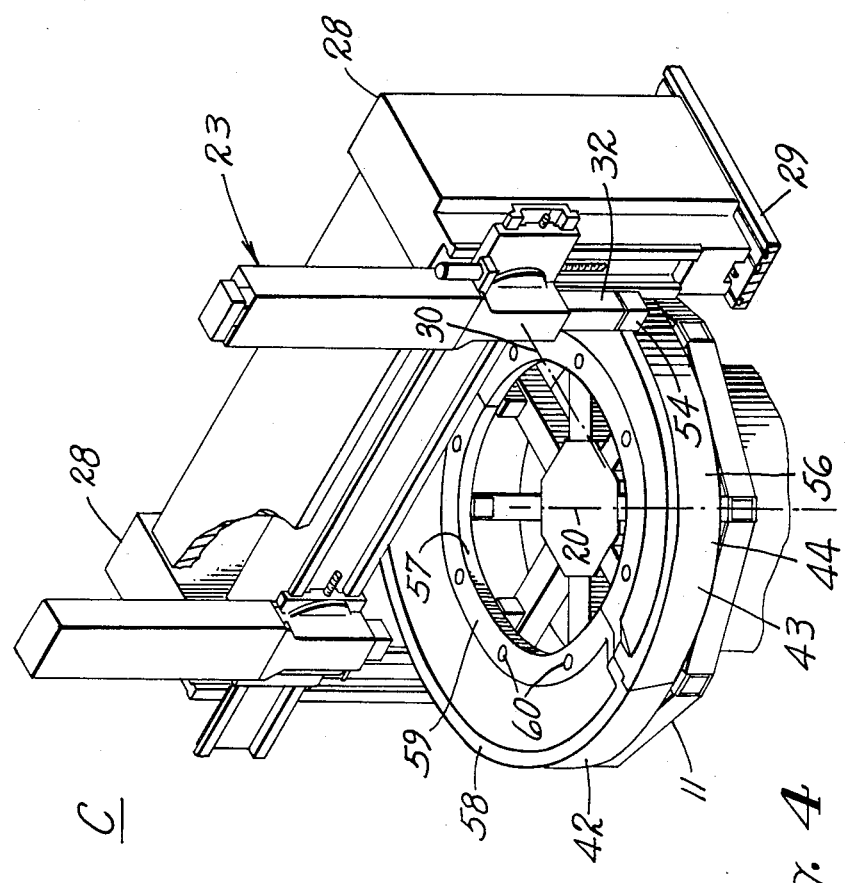
FIG. 4 is a view of the machine shown in FIG. 2 set up to perform turning, facing, boring and other operations to finish the gear blank.

Referring to step C of FIG. 1 and FIG. 4, the segments 42, 43 have been bolted together to form the unitary gear blank 44 which is centered on the axis 20 and secured to the table 11 for all subsequent operations. The tool head 23 is set in vertical position and the live spindle tool support 45 is replaced with a tool head 54 having one or more cutters suitable for turning the outside diameter 56 of the blank and boring the inside diameter 57. Faces 58 and 59 can either be turned in a facing operation using a fixed bit on the tool holder 54 or can be milled using a milling cutter in a live spindle head on the end of ram 32. For these operations, the columns 28 are adjusted along the ways 29 to align the tool head 23 with the axis 20 of rotation of the table 11. Without changing the location of the gear blank on the table a live spindle may be placed on the ram 32 and appropriate tools used to drill locating holes 60 in the face 59.

Figure 5:
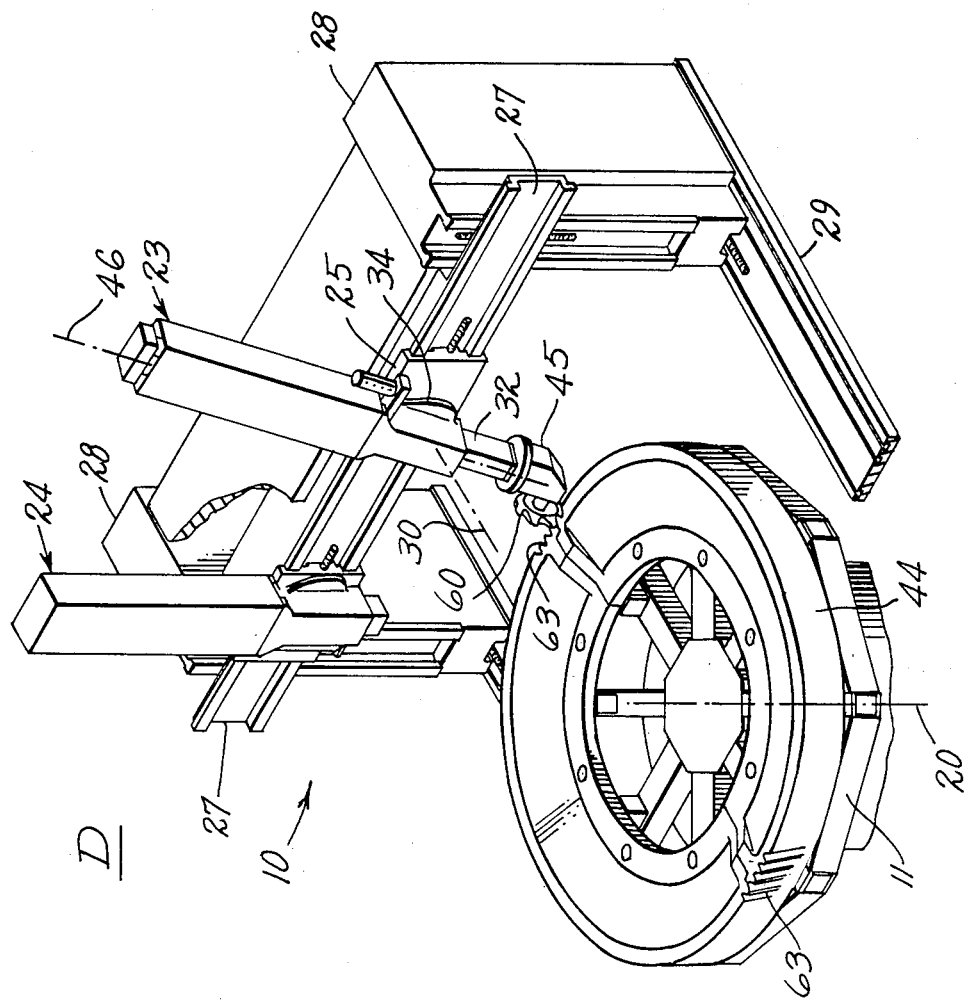
FIG. 5 is a view of the machine set-up to rough cut gear teeth on the peripheral face of the blank; and, FIG. 6 is a view of the machine set-up to perform the tooth finishing operation.

Referring to step D of FIG. 1 and FIG. 5, the live spindle tool holder 45 is secured to the end of the ram 32 and a roughing gear form cutter 60 is placed in the live spindle. If straight spur gear teeth are to be cut on the gear blank, the tool head 23 is adjusted on axis 30 into its vertical disposition. However, as shown in FIG. 5 if helical teeth 63 are to be cut, the head 23 is set in angular disposition matching the helix angle of the gear teeth to be formed. The ram 32 and tool head 45 are reciprocated along axis 46 to form the spaces between the gear teeth with the gear blank 44 being indexed about axis 20 from tooth space to tooth space. If desired, the blank may be oscillated on axis 20 while the tool head is reciprocated along the crossrail 27 according to an appropriate electronically controlled ratio to generate the tooth profiles using appropriate tooling. In any event, each tooth usually is machined separately with the table indexing from one tooth to the next until all teeth are roughed. Obviously, the teeth can be rough or finished cut at this time in any other well known gear cutting method such as hobbing without departing from the scope of the invention.

Figure 6:
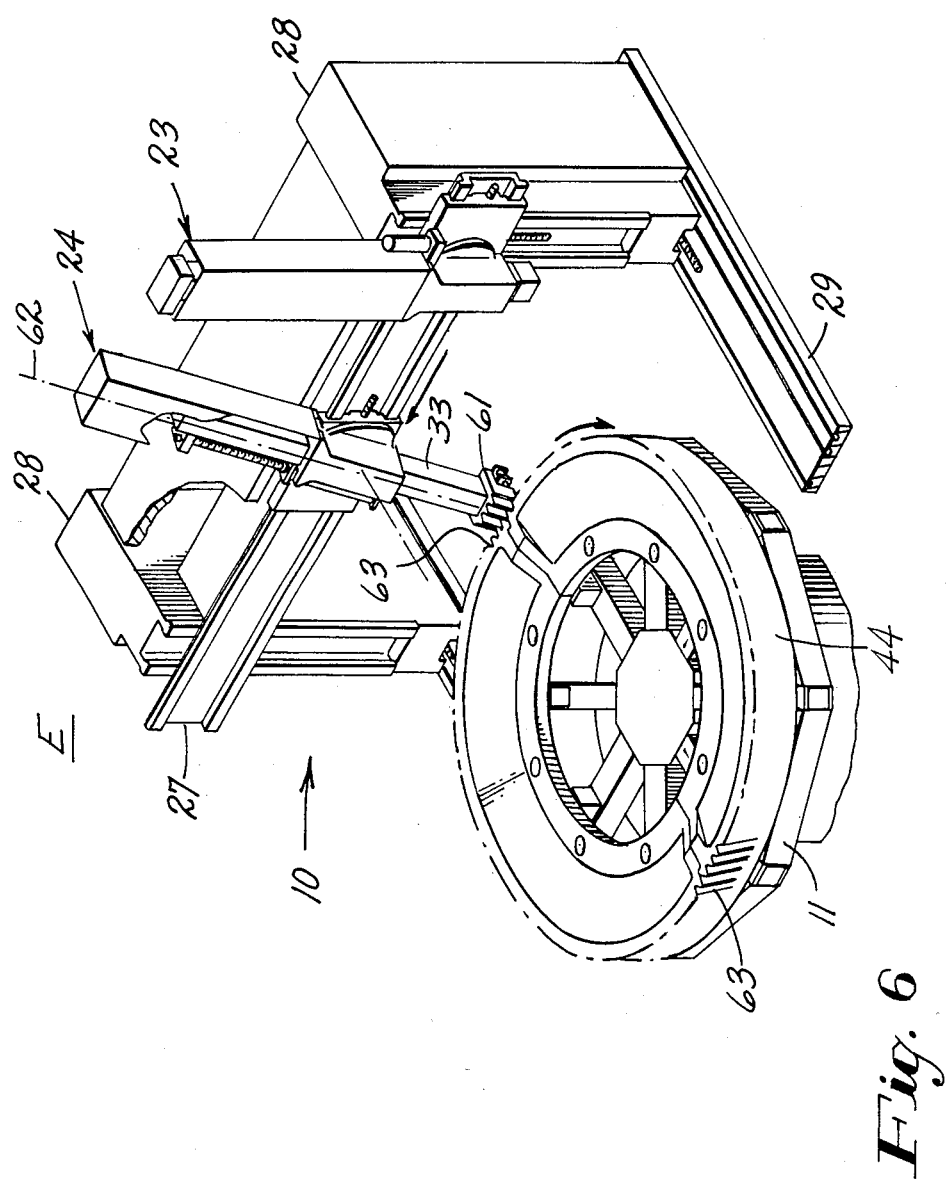

Referring to step E of FIG. 1 and FIG. 6, the tool head 24 is shown in its angularly adjusted position matching the helix angle of the helical gear teeth. A rack-like cutter 61 is shown secured to the lower end of ram 33. Obviously, this cutter could be attached to the ram 32 of head 23 without departing from the scope of the invention. According to well known gear cutting practices, the gear teeth previously roughed in step D are finished to their final shape and size by a generating action provided during reciprocation of a rack-like tool 61 along the axis 67 of the ram 33 and concurrent movement of the head 24 along crossrail 27 while the gear blank is rotated according to a predetermined electronically controlled ratio. According to common practice the blank is also indexed from tooth to tooth. Obviously, other means for finish cutting the gear teeth may be utilized such as shaving, grinding or hobbing the tooth profiles.

After completion of the finish tooth cutting, the completed gear may be removed from the table 11. The gear teeth and the mounting surfaces are concentric with no transport and set-up being involved once the gear blank has been centered and secured to the table in step C. Obviously, if a single part gear blank is utilized, steps A and B can be omitted. While use of two tool heads 23 and 24 has been described, it should be apparent that all operations could be performed using only one head. If only straight spur gear teeth are to be formed there would no need for more costly swivel heads to be used. Also if "herringbone" teeth are to be formed, then the heads would be swiveled to complementary angles and preferably the lower set of helical teeth would be cut in steps D and E with up-stroking actions of the cutting tools. Furthermore, while the invention is illustrated as machining teeth on the outer diameter of the blank, clearly with only minor modification, of the steps, internal teeth could also be machined without departing from the scope of the invention. While a double column vertical boring mill has been illustrated, it should be obvious that a single column open side boring mill could be used with minor modification of the various steps involved.

Having thus described the invention it should be apparent that many modifications could be made to the equipment involved or other types of readily available boring mill machinery, tools and controls used without departing from the scope of the invention defined by the appended claims.

I claim:

1. A method of manufacturing large gears on a vertical boring mill having a single machining center axis about which a rotary table rotates including the steps of: securing an unmachined unitry large gear blank centered on the rotary table of said boring mill for rotation about said axis, turning the concentric surfaces and faces of the secured blank by movement of a tool relative to said table during rotation thereof, to form a finished gear blank, machining mounting holes and surfaces on the finished gear blank which remains secured to said table; and forming the gear teeth on the finished blank which remains secured to said table.

2. A method according to claim 1 in which the boring mill is provided with one or more tool heads each mounted on a ram which is reciprocated heightwise with respect to the surface of the table to which the gear blank is secured; mounting the ram for horizontal movements along a crossrail; and coordinating horizontal tool movement along the crossrail with the rotation of the table and the heightwise reciprocating of the ram and tools for generating gear teeth on the gear blank.

3. A method of manufacturing large gears from multipart blanks on a large vertical boring mill having a single machining center axis about which a rotary table rotates including the steps of: assembling and securing all parts of the blank in aligned and spaced relation on the rotary table of the boring mill, machining the joining surfaces and connecting holes on each part of the blank while secured to the table, assembling the parts together to form a unitary blank without removal from the table, centering and securing the unitary blank on the table for rotation about said axis, turning the concentric surfaces and faces of the secured unitary blank, while secured to the table, by movement of a tool relative to said table during rotation thereof, machining mounting and locating holes and surfaces on the blank while remaining secured to the table, and forming the gear teeth on the finished unitary blank while remaining secured to the table.

4. A method according to claim 3 in which the gear teeth forming step includes generating the tooth surfaces by mounting a gear generating tool for reciprocation tangentially of the periphery of the gear blank on which the gear teeth are to be formed and coordinating the rotation of the table and reciprocation of the tool.

* * * * *